(12) United States Patent (10) Patent No.: US 8,392,341 B2
Lee (45) Date of Patent: Mar. 5, 2013

(54) INTELLIGENT ROBOT AND CONTROL METHOD THEREOF

(75) Inventor: Kang Hee Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 477 days.

(21) Appl. No.: 12/591,609

(22) Filed: Nov. 24, 2009

(65) Prior Publication Data

US 2010/0153317 A1 Jun. 17, 2010

(30) Foreign Application Priority Data

Dec. 11, 2008 (KR) .......................... 10-2008-0125755

(51) Int. Cl.
*G06F 15/18* (2006.01)
(52) U.S. Cl. ........................................ 706/12
(58) Field of Classification Search ........................ None
See application file for complete search history.

(56) References Cited

U.S. PATENT DOCUMENTS

2006/0155765 A1* 7/2006 Takeuchi et al. ........... 707/104.1
2008/0147691 A1* 6/2008 Peters ........................... 707/100

OTHER PUBLICATIONS

'Ubiguitous robot S/W platform, AnyRobot studio and its demonstration, AnyKids service': Lee, 2008, IEEE, 1-4244-2384-2.*
'CAMUS: A middleware supporting context aware services for network based robots': Kim, 2005, IEEE, 0-78-3-8947.*
'A two layer model for behavior and dialogue planning in conversational service robots': Nakano, 2005, IEEE, 10.1109/IROS.2005. 1545198.*
"RavenClaw", Olympus Dialog System Frame, 2 pages, http://wiki.speech.cs.cmu.edu/olympus/index.php/RavenClaw.
"Olympus", Olympus Dialog System Frame, 5 pages, http://wiki.speech.cs.cmu.edu/olympus/index.php/Olympus.

* cited by examiner

*Primary Examiner* — Kakali Chaki
*Assistant Examiner* — Peter Coughlan
(74) *Attorney, Agent, or Firm* — Staas & Halsey LLP

(57) ABSTRACT

Disclosed herein are a robot with a judgment system to enable implementation of multi-dimensional recognitions, thoughts and actions, and a control method thereof. The judgment system includes a dialog system and a task-planning system. The dialog system includes a dialog manager to manage the progress of a dialog of the intelligent robot with a user. The task-planning system includes a leader agent, an action agent and an interaction agent and serve to control a goal, plan and action of a task to be performed by the intelligent robot based on the dialog. The judgment system assists separation of concerns and consequently, enhances convenience of development. The judgment system of the robot contains a mechanism that considers a great number of cases, such as a task priority, immediate user input, inherent robot task, etc., enabling implementation of multi-dimensional recognitions, thoughts and actions.

16 Claims, 8 Drawing Sheets

INTELLIGENT ROBOT AND CONTROL METHOD THEREOF

CROSS-REFERENCE TO RELATED APPLICATIONS

This application claims the priority benefit of Korean Patent Application No. 2008-0125755, filed on Dec. 11, 2008 in the Korean Intellectual Property Office, the disclosure, of which is incorporated herein by reference.

BACKGROUND

1. Field

Embodiments relate to an intelligent robot and a control method thereof, and, more particularly, to an intelligent robot with a judgment system including a dialog system and a task-planning system and a control method thereof.

2. Description of the Related Art

Nowadays, a dialog system for general robots is mainly used in appliances, such as home electronics, cell phones, etc., which include artificial intelligence agents and can be embedded anywhere, as well as humanoid service robots. Also, a task-planning system for robots is widely used in industrial robots, etc. eliminating a necessity for interaction or dialog with human beings.

The above-described dialog system and task-planning system have complex constituent elements, respectively and furthermore, independently exhibit an excellent modality as well as a possibility of artificial intelligence operation. Therefore, research into design of a judgment system, required to provide a service while keeping a dialog with a user in homes or offices, has been carried out by rules of thumb.

Actually, in the case where a judgment system is realized by coupling a dialog system and a task-planning system as independent systems of a robot, the dialog system may be a main system to control the task-planning system, and conversely, the task-planning system may be a main system to control the dialog system. Accordingly, such a judgment system must be designed in consideration of a great number of cases wherein: a dialog may be done during implementation of a task; a further task may be added in the course of a dialog; signals from sensors may be input while keeping a dialog; and an optional scheduled task may be performed without a dialog. For example, although it is desirable that a partial region of a single brain charges a dialog function and the other region of the brain plans and executes human action, the judgment system must realize a good mechanism that considers a great number of cases as described above without neglecting a task priority, immediate user input, inherent robot task, etc. Absence of the mechanism causes complication and deterioration in the judgment system and makes it difficult to anticipate a good performance of the judgment system.

SUMMARY

In an aspect of exemplary embodiments, there is provided a design mechanism for a judgment system wherein a task-planning system and a dialog system for a robot are coupled with each other without a reduction in functionality of any one of the systems.

In an aspect of exemplary embodiments, there is provided a task-planning system designed as a multi-dimensional Finite State Machine (FSM) in which the number of one-dimensional inputs and outputs can be increased to the number of inputs and outputs of various kinds of multi-dimensional recognitions, thoughts and actions.

In accordance with an aspect of exemplary embodiments, there is provided an intelligent robot having a judgment system, wherein the judgment system includes: a dialog system including a dialog manager to manage the progress of a dialog of the intelligent robot with a user; and a task-planning system which includes a leader agent, an action agent and an interaction agent and which controls a goal, plan and action of a task to be performed by the intelligent robot based on the dialog.

The leader agent may integrate and regulate the other agents while maintaining a high-level-goal.

The action agent may control sensing and actuation related to hardware.

The interaction agent may monitor a state of the dialog manager and reflect the state of the dialog manager in the task goal, plan and action of the task-planning system.

The judgment system may further include a situation recognizer, and the situation recognizer may synthesize a dialog situation, a task implementation situation, or sensor input situation, so as to transmit desired information to the dialog system or task-planning system.

The judgment system may further include a database, and the database may stores information generated by the intelligent robot.

The dialog system and the task-planning system may be coupled to each other via a homogeneous or heterogeneous communication protocol.

The dialog manager may generate a response via comprehension of a meaning of a dialog input by a speaker and synthetic situation judgment.

In accordance with an aspect of exemplary embodiments, there is provided a control method of an intelligent robot including: a dialog system including a dialog manager to manage the progress of a dialog of the intelligent robot; and a task-planning system which includes a leader agent, an action agent and an interaction agent, and which controls a goal, plan and action of a task to be performed by the intelligent robot based on the dialog, the control method including: transiting the interaction agent to an idle state; sensing a user interface via the dialog manager; allowing the robot to perform a user interface attention if the user interface is sensed; and performing a call-and-come dialog with a user by the dialog manager if the user interface attention is performed.

The control method may further include: transiting the interaction agent to a busy state if the call-and-come dialog is performed.

The control method may further include: sensing whether or not an additional user interface is generated before the interaction agent is transited to the busy state.

The control method may further include: performing a user-interface-busy-interrupt-dialog if the additional user interface is generated.

The control method may further include: sensing whether or not an additional user interface is generated if the interaction agent is transited to the busy state.

The control method may further include: performing a task busy attention if the presence of the additional user interface is confirmed.

The control method may further include: performing a task-busy-interrupt-dialog if the task busy attention is performed.

The control method may further include: performing a task attention if the interaction agent is transited to the busy state.

The control method may further include: performing a task-specific-dialog if the task attention is performed.

BRIEF DESCRIPTION OF THE DRAWINGS

These and/or other aspects of exemplary embodiments will become apparent and more readily appreciated from the fol

DETAILED DESCRIPTION

Figure 1:
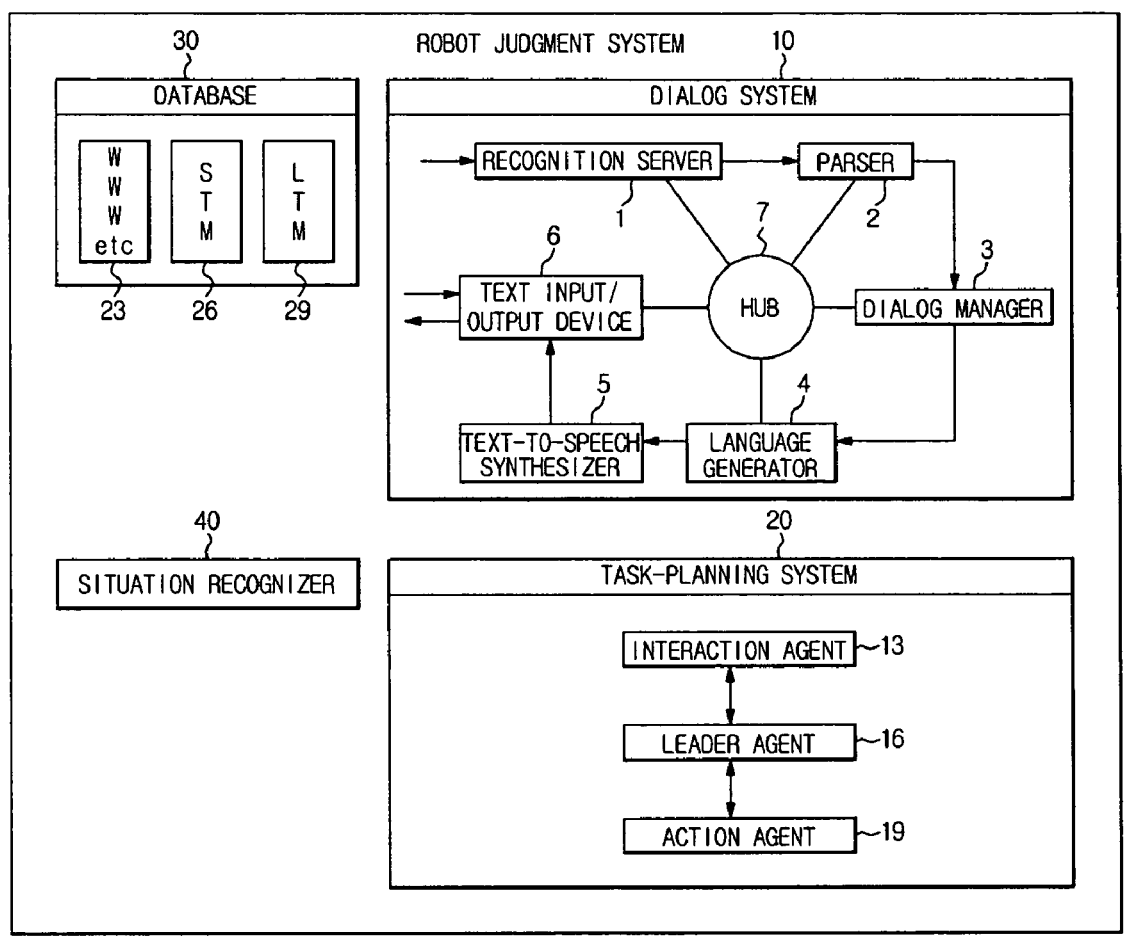
- FIG. 1 is a schematic block diagram illustrating the configuration of a judgment system for an intelligent robot according to an exemplary embodiment.

Reference will now be made in detail to exemplary embodiments, examples of which are illustrated in the accompanying drawings, wherein like reference numerals refer to like elements throughout. Exemplary embodiments are described below by referring to the figures.

FIG. 1 is a schematic configuration view of a robot judgment system for an intelligent robot according to an exemplary embodiment.

As shown in FIG. 1, the robot judgment system according to an exemplary embodiment includes a dialog system 10 having an independent dialog ability with a domain, a task-planning system 20 having a plurality of agents to enable separation of concerns and to enhance convenience of development, a database 30 in which background information or history information related to the intelligent robot, etc. are stored, and a situation recognizer 40 to recognize peripheral situations of the robot, sensor input situations, etc.

The dialog system 10 is a communication architecture using message-passing communication between components. The dialog system 10 can perform functions, such as speech recognition, spoken language compression, language generation, etc. Implementation procedures of these functions will be described hereinafter in detail.

A recognition server 1 is able to recognize exterior speech and serves as a user input for interaction between the dialog system 10 and a user. The recognition server 1 further has an ability to recognize a sentence, i.e. text. The recognition server 1 transmits information about the recognized speech or text to a parser 2.

The parser 2 divides respective words of the recognized speech or text. For example, if speech or text "Bring me the cup" is input, the parser 2 divides the input speech or text into individual words "bring", "me" and "the cup". Here, the word "bring" is an instruction related to action, the word "me" is related to a subject, and the word "the cup" is related to a target. Dividing the speech or text into the individual words enables extraction of meaning elements and accordingly, comprehension of a meaning of the input speech or text.

A dialog manager 3 builds a dialog table to synthetically manage the progress of a dialog and furthermore, generates a text response via comprehension of the meaning of the input speech provided by a speaker and synthetic situation judgment.

A language generator 4 composes a sentence by combining words of the text response generated by the dialog manager 3. In this case, a desired language, such as Korean, English, or the like, can be selected based on user input.

A text-to-speech synthesizer 5 synthesizes text, i.e. the sentence composed by the language generator 4 into a speech. A text input/output device 6 is used to directly transmit text to the dialog manager 3 via a hub 7 without the above-mentioned recognition server 1 and parser 2.

The hub 7 is a central server to enable communication between all the above-described elements.

The above-described dialog system 10 is a known Olympus system that has been widely used since being developed by professors Carbonell and Rudnicky at Carnegie Mellon University Language Technologies Institute (CMULTI).

The task-planning system 20 is a mechanism to execute a task using a plurality of agents, i.e. an interaction agent 13, a leader agent 16, and an action agent 19. Detailed operations of these agents will be described as follows.

The interaction agent 13 continuously monitors and reflects the state of the dialog manager 3 of the dialog system 10 and also, receives an interrupt from the dialog manager 3. In addition, the interaction agent 13 analyzes information and goals transmitted from the dialog manager 3. The interaction agent 13 allows the leader agent 16 to initiate an action corresponding to a high-level goal.

The leader agent 16 integrates and regulates other agents while maintaining the high-level goal analyzed by the interaction agent 13.

The action agent 19 charges tasks related to sensing and actuation of hardware of the robot.

The task-planning system 20 according to an exemplary embodiment is designed as a multi-agent system as described above and therefore, can assist separation of concerns, enhancing convenience of development. For example, when replacing one agent with a simple test agent or program having a basic harness, an independent test of the task-planning system 20 may be possible.

The database 30 stores program data required for robot action and a variety of preset values. The database 30 may include a web part 23 to receive desired information from the World Wide Web, a Short Term Memory (STM) 26 in which information can be stored for a short term, and a Long Term Memory (LTM) 29 in which information can be stored for a long term.

The situation recognizer 40 recognizes the most appropriate situation by synthesizing a very complex dialog situation, task-implementation situation, sensor input situation, etc., and transmits the resulting information to the dialog system 10 and the task-planning system 20. For example, if a user inputs a speech or text instruction "Bring me the cup" to the robot, the situation recognizer 40 recognizes the user instruction together with exterior circumstances, such as seasons, etc., so as to transmit action information corresponding to the most appropriate situation to the dialog system 10 and the task-planning system 20, thereby allowing the robot to bring cold water in summer and hot water in winter for example.

Hereinafter, communications between the respective agents will be described in brief.

Firstly, the task-planning system 20 and the dialog manager 3 may be coupled to each other via a homogeneous or heterogeneous communication protocol. When using a heterogeneous protocol, a middleware may be provided between the task-planning system 20 and the dialog manager 3 for smooth communication therebetween. The task-planning system 20 and the dialog manager 3 are adapted to respond to and asynchronously send messages therebetween. For example, the task-planning system 20 can communicate with the dialog manager 3 to allow the dialog manager 3 to initiate a dialog during implementation of a task. Also, for example, the dialog manager 3 can interrupt the task-planning system 20 when the task-planning system 20 performs a task via interaction with the user.

Secondly, considering communication from the dialog manager 3 to the interaction agent 13, events generated from the dialog manager 3 must be continuously transmitted to the interaction agent 13. In this case, an attention request by various user interfaces as well as an attention request by the dialog manager 3 must be dealt with in the same manner. For example, the robot must respond equally to an attention request that calls the robot's name, or to an attention request by hand clapping or touch. In addition, after completion of a dialog, a dialog end signal must be transmitted.

Thirdly, considering communication from the dialog manager 3 to the task-planning system 20, goals, which are required by the user during a dialog, are transmitted to the leader agent 16. These goals must be transmitted in the same manner even if they are proposed via different modalities.

Fourthly, considering communication from the interaction agent 13 to the dialog manager 3, it is noted that the dialog manager 3 does not know the state of the entire system. Therefore, when the interaction agent 13 enters a new state of a Finite State Machine (FSM), all information related to the new state must be transmitted to the dialog manager 3.

Fifthly, considering communication from the task-planning system 20 to the dialog manager 3, the task-planning system 20 must transmit all temporary states of the robot related to a dialog. For example, information related to whether or not a queue of the leader agent 16 contains an optional task that must be executed at once, or information related to whether or not a dialog must be unintentionally stopped while the robot returns to a charge station due to discharge of a battery, must be transmitted.

Figure 2A:
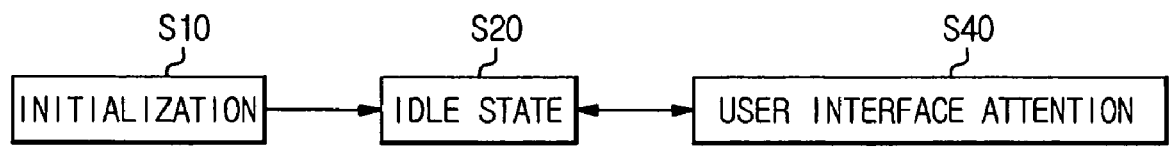
FIG. 2A is a flowchart illustrating an action associated with a user initial interface and the robot according to an exemplary embodiment.

FIG. 2A is a flowchart illustrating an action associated with a user initial interface and the robot according to an exemplary embodiment.

As shown in FIG. 2A, if power is applied to the robot according to an exemplary embodiment, the robot is initialized. Specifically, the above-described systems of the robot are reset for initialization (S10). In this case, the interaction agent 13 of the robot is transited to an idle state, standing ready to receive a user command (S20). In the idle state, an optional user interface component may generate an attention request for the robot, and a plurality of user interface components may be present. For example, the user interface components may include words requesting special attention (for example, "come here", "come on", "attention", "robot", etc.), hand clapping, touch, wireless remote control, push of call buttons, and the like.

If the presence of the user interface component is confirmed, the robot performs a user interface attention. Here, according to a general social model, when the robot pays attention to the user, the robot desirably stands face to face with the user at an appropriate distance. The user interface attention is immediately stimulated by a user attention request. This has the effects of preventing the beginning of a robot-initiated task and also, of preventing any indecisive situation wherein the robot cannot form a decision when a plurality of users make attention requests simultaneously. If the attention by the user interface component fails, the interaction agent 13 returns to the idle state (S40).

Figure 2B:
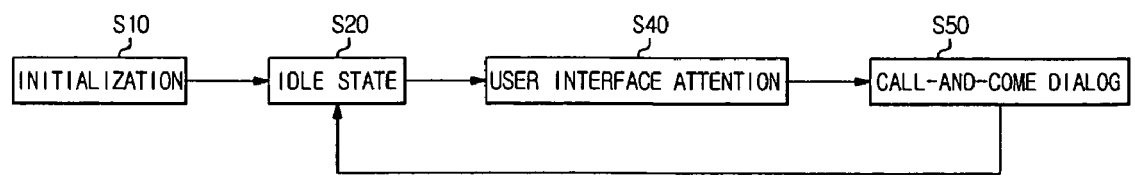
FIG. 2B is a flowchart illustrating an action associated with a user initial dialog and the robot according to an exemplary embodiment.

FIG. 2B is a flowchart illustrating an action associated with a user initial dialog and the robot according to an exemplary embodiment.

As described above with reference to FIG. 2A, the robot according to an exemplary embodiment is transited to the idle state after initialization thereof. As described above, if the attention request for the robot is input by the user interface component, for example, the user speech call "robot", the user interface attention is performed, completely preparing a dialog (S10, S20 and S40).

Once the preparation of a dialog is completed as the robot pays attention to the user, the robot performs a call-and-come dialog with the user (S50). For example, the call-and-come dialog is performed in such a manner that if the user gives the robot an instruction "Come here", the robot will answer "Yes, sir" and thereafter, if the user gives the robot an instruction "Bring me the cup", the robot will answer "Yes sir". In this case, the dialog manager 3 may propose a goal to the task-planning system 20 after completion of the call-and-come dialog or during the call-and-come dialog. The proposed goal is stored in the queue of the leader agent 16. After the dialog ends, the robot performs a task stored in the queue in response to the user command. If the dialog manager 3 sends a signal informing of completion of the dialog, the robot is again transited to the idle state (S60).

Figure 2C:
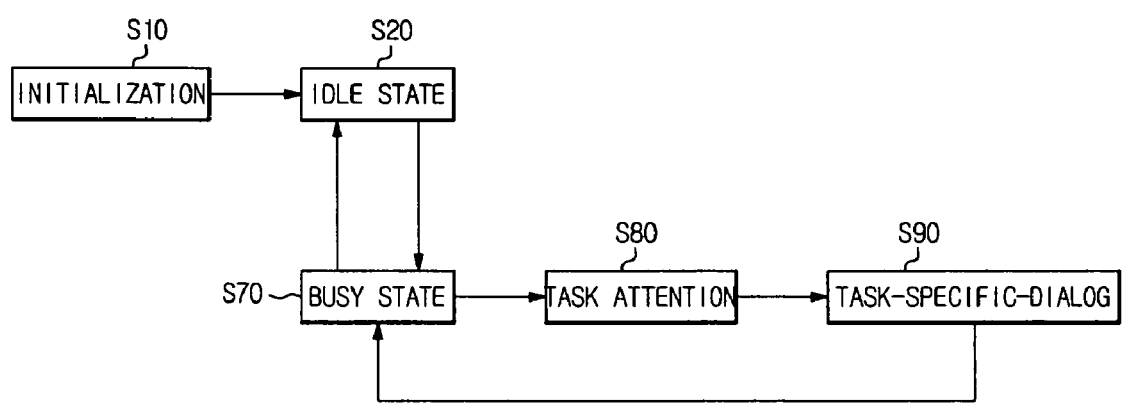
FIG. 2C is a flowchart illustrating a dialog action during implementation of a task between a user and the robot according to an exemplary embodiment.

FIG. 2C is a flowchart illustrating a dialog action during implementation of a task between the user and the robot according to an exemplary embodiment.

Similar to the above descriptions of FIGS. 2A and 2B, if the presence of the user interface component is confirmed, after sequential implementation of the user interface attention and call-and-come dialog, the interaction agent 13 is transited from the idle state to a busy state. Here, the busy state represents an optional non-dialog state wherein the robot pays attention to the user. If the interaction agent 13 is in the idle state, transition to the busy state may be achieved only by the leader agent 16 (S10, S20 and S70).

Then, to enable task interaction between the user and the robot in the busy state, the robot performs a task attention. As a dialog mode is prepared by the task attention of the robot, the robot can perform a task-specific-dialog required for implementation of a user instruction task (S80 and S90).

For example, if a task instruction of the call-and-come dialog is "Bring me the cup", the task-specific-dialog deals with a dialog message "Here you are", "Anything extra you'd like done?", etc.

Since a single goal to be performed by the robot requires interaction with a person, the leader agent 16 can begin a dialog for a certain specific task, i.e. a task-specific-dialog, such as an article transfer request, an assistance request, a clear pronunciation request, etc. The interaction agent 13 is transited from the busy state to the idle state after completion of the task.

Figure 2D:
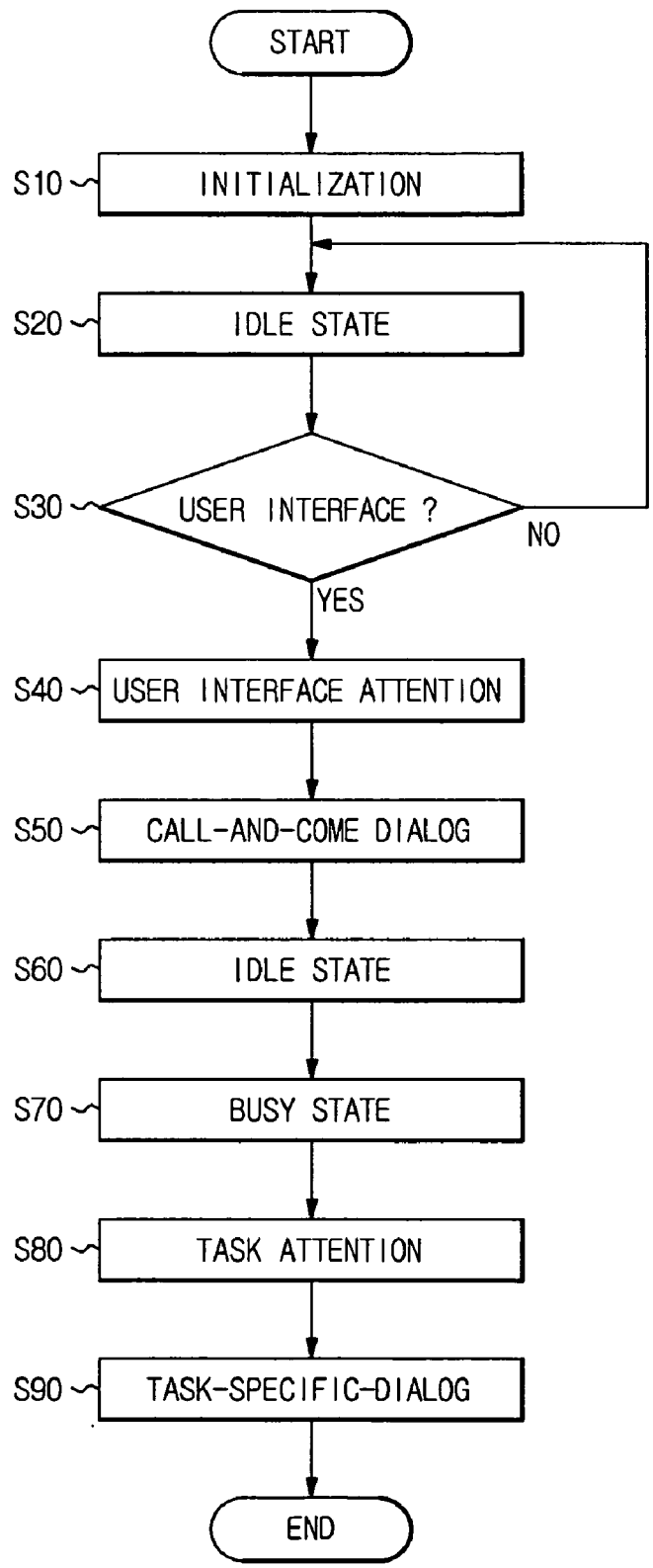
FIG. 2D is a control flowchart illustrating a dialog action between a user and the robot according to an exemplary embodiment.

FIG. 2D is a control flowchart illustrating a dialog action between the user and the robot according to an exemplary embodiment.

FIG. 2D is a combined flowchart of FIGS. 2A to 2C, and the same reference numerals are assigned to the same blocks as in FIGS. 2A to 2C.

If power is applied to the robot according to an exemplary embodiment, the robot is initialized. Specifically, the above-described systems of the robot are reset for initialization (S10).

Next, the interaction agent 13 is transited to an idle state by the leader agent 16, standing ready to receive a user command (S20).

The dialog manager 3 confirms that an optional user interface component is generated in the idle state so as to give the robot an attention request. Specifically, if any user interface component selected from among words requesting special attention (for example, "come here", "come on", "attention", "robot", etc.), hand clapping, touch, wireless remote control, push of call buttons, and the like is present, information related to the user interface component is transmitted to the interaction agent 13. Also, events generated from the dialog manager 3 are continuously transmitted to the interaction agent 13 (S30).

After the presence of the user interface component is confirmed, the robot performs a user interface attention. Here, according to a general social model, when the robot pays attention to the user, the robot desirably stands face to face with the user at an appropriate distance. The user interface attention is immediately stimulated by a user attention request. This has the effects of preventing the beginning of a robot-initiated task and also, of preventing any indecisive situation wherein the robot cannot form a decision when a plurality of users request attention simultaneously (S40).

Once the preparation of a dialog is completed as the robot pays attention to the user, the robot performs a call-and-come dialog with the user. For example, the call-and-come dialog is performed in such a manner that if the user gives the robot an instruction "Come here", the robot will answer "Yes, sir" and thereafter, if the user gives the robot an instruction "Bring me the cup", the robot will answer "Yes sir" (S50).

Then, the interaction agent 13 is transited to the idle state (S60).

Subsequently, the interaction agent 13 is transited from the idle state to a busy state. Here, the busy state represents an optional non-dialog state wherein the robot pays attention to the user. If the interaction agent 13 is in the idle state, transition to the busy state may be achieved only by the leader agent 16 (S70).

Then, to enable task interaction between the user and the robot in the busy state, the robot performs a task attention (S80).

As a dialog mode is prepared by the task attention of the robot, a task-specific-dialog required for implementation of a user instruction task can be achieved.

For example, if a task instruction of the call-and-come dialog is "Bring me the cup", the task-specific-dialog deals with a dialog message "Here you are", "Anything else you'd like done?", etc. In another example, if a task instruction of the call-and-come dialog is "Give lunch to my daughter Young-iee", the task-specific-dialog deals with a dialog message "Miss Young-iee, have brought lunch for you", "Miss Young-iee, it is time to have a lunch", "Miss Young-iee, I will clean up after you have had your lunch", etc. (S90).

Figure 3A:
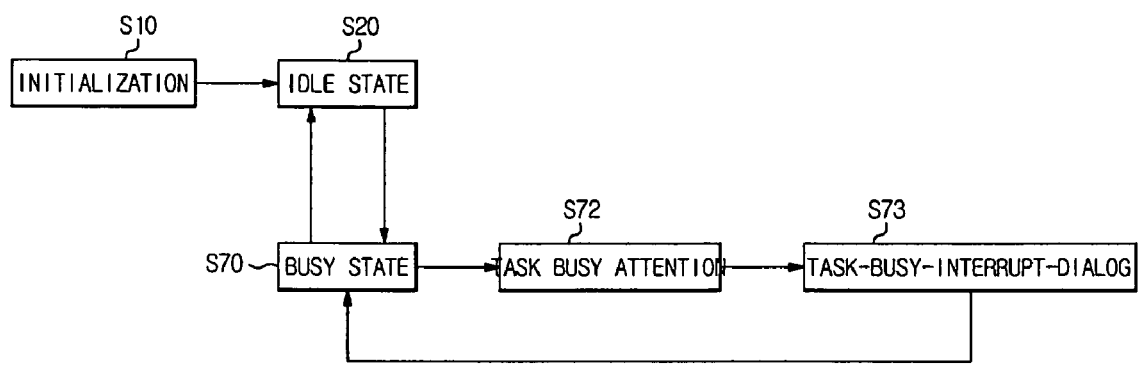
FIG. 3A is a flowchart illustrating an action in response to an attention request input by another user during implementation of a task by the robot according to an exemplary embodiment.

FIG. 3A is a flowchart illustrating an action in response to an attention request input by another user during implementation of a task by the robot according to an exemplary embodiment.

As described with relation to FIG. 2D, if the presence of the user interface component is confirmed, the robot completes the preparation of a dialog via a user interface attention and thereafter, performs a call-and-come. The interaction agent 13 is transited to a busy state and must perform a task stored in the queue when being returned to an idle state. In this case, if another user issues an attention request to the robot, a dialog with another user must be different from the original attention request dialog, i.e. the call-and-come dialog. Accordingly, when an attention request by another user is input during implementation of a task by the robot, the robot performs a task busy attention. Here, the task busy attention represents an action for interaction with another user interface. After the robot completes the preparation of a dialog with another user via the task busy attention, the robot performs a task-busy-interrupt-dialog. Considering that the robot is performing a task instruction input by the previous user, the task-busy-interrupt-dialog may deal with a message "Sorry, I am performing other things", etc. The robot can perform an instruction of the present user according to a task priority previously stored in the robot (S10, S20, S70, S72 and S73).

Figure 3B:
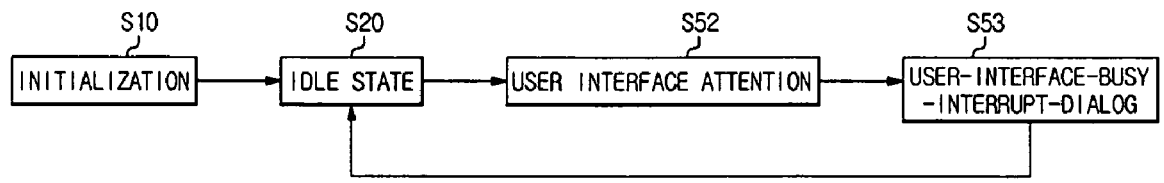
FIG. 3B is a flowchart illustrating an action in response to an attention request input by another user before the robot initiates a task after receiving an instruction transmitted thereto according to an exemplary embodiment.

FIG. 3B is a flowchart illustrating an action in response to an attention request input by another user before the robot initiates a task after receiving an instruction transmitted thereto according to an exemplary embodiment.

As shown in FIG. 3B, an optional interrupt may be generated before the leader agent 16 of the robot performs a task. Specifically, after one user inputs an attention request to the robot, another user may input an additional attention request to the robot during a dialog or before the robot initiates a task after completion of the dialog. In this case, a user-interface-busy-interrupt-dialog may be performed in consideration of the relationship with the previous user who previously requested a dialog (S10, S20, S52 and S53).

Figure 3C:
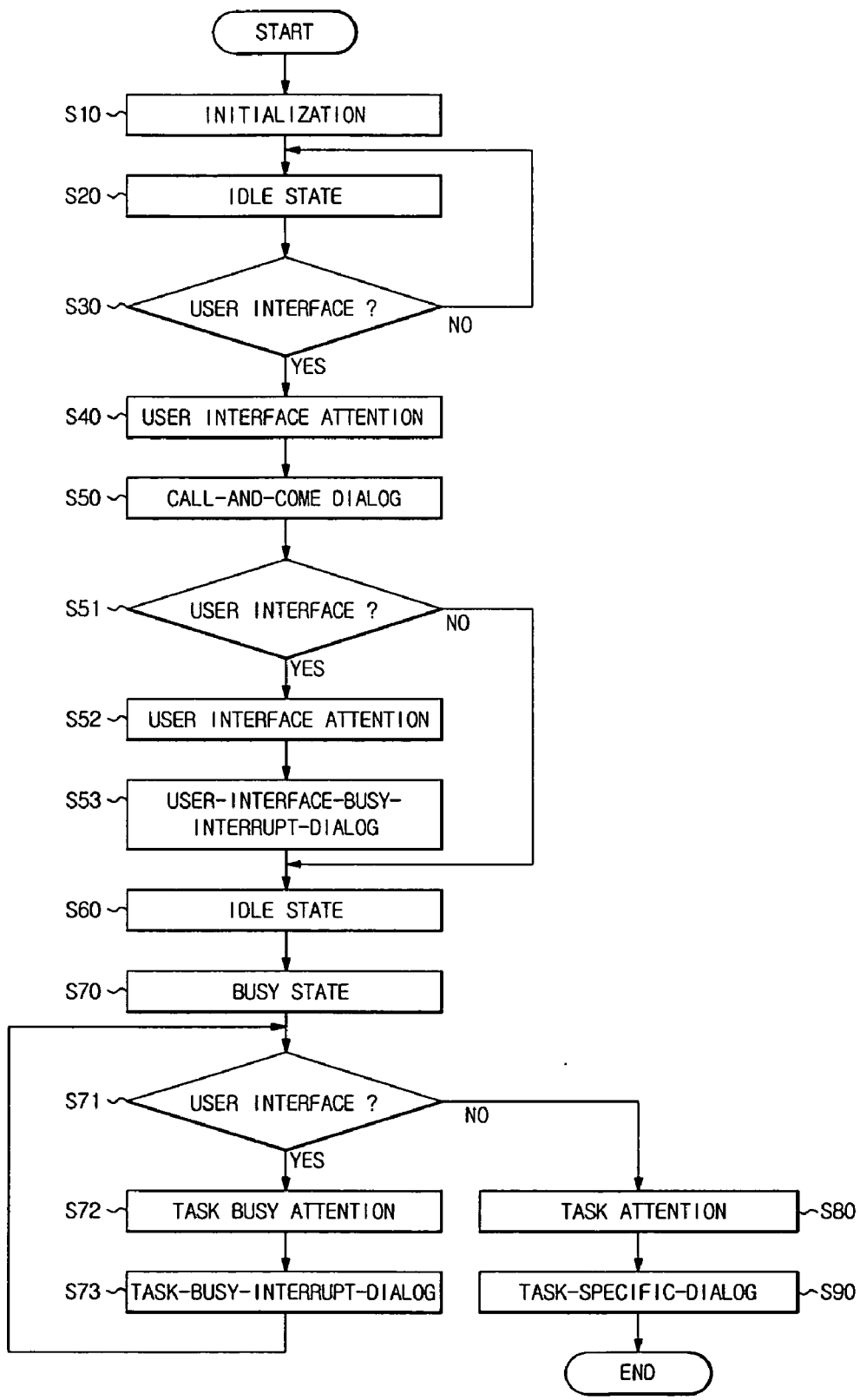
FIG. 3C is a control flowchart illustrating a dialog action between the user and the robot according to an exemplary embodiment.

FIG. 3C is a control flowchart illustrating a dialog action between the user and the robot according to an exemplary embodiment.

FIG. 3C is a combined flowchart of FIGS. 3A and 3B, and the same reference numerals are assigned to the same blocks as in FIGS. 3A and 3B.

If power is applied to the robot according to an exemplary, the robot is initialized. Specifically, the above-described systems of the robot are reset for initialization (S10).

Next, the interaction agent 13 is transited to an idle state by the leader agent 16, standing ready to receive a user command (S20).

The dialog manager 3 confirms that an optional user interface component is generated in the idle state so as to give the robot an attention request. Specifically, if any user interface component selected from among words requesting special attention (for example, "come here", "come on", "attention", "robot", etc.), hand clapping, touch, wireless remote control, push of call buttons, and the like is present, information related to the user interface component is transmitted to the interaction agent 13 (S30).

After the presence of the user interface component is confirmed, the robot performs a user interface attention. Here, according to a general social model, when the robot pays attention to the user, the robot desirably stands face to face with the user at an appropriate distance. The user interface attention is immediately stimulated by a user attention request. This has the effects of preventing the beginning of a robot-initiated task and also, of preventing any indecisive situation wherein the robot cannot form a decision when a plurality of users request attention request simultaneously (S40).

Once the preparation of a dialog is completed as the robot pays attention to the user, the robot performs a call-and-come dialog with the user. For example, the call-and-come dialog is performed in such a manner that if the user gives the robot an instruction "Come here", the robot will answer "Yes, sir" and thereafter, if the user gives the robot an instruction "Bring me the cup", the robot will answer "Yes sir" (S50).

Then, it is confirmed whether or not an additional user interface is generated, i.e. whether or not an attention request by an optional user is input during a dialog with a previous user, or after completion of the dialog and before initiation of a task (S51).

If the presence of the additional user interface is confirmed, the robot performs a user interface attention and in turn, performs a user-interface-busy-interrupt-dialog, enabling implementation of a dialog in consideration of the relationship with the previous user who previously requested a dialog. For example, the robot deals with a dialog message "Another user is already trying to dialog" (S52 and S53).

Next, the interaction agent 13 is transited to the idle state (S60).

Subsequently, the interaction agent 13 is transited from the idle state to a busy state. Here, the busy state represents an optional non-dialog state wherein the robot pays attention to the user. If the interaction agent 13 is in the idle state, transition to the busy state may be achieved only by the leader agent 16 (S70).

Thereafter, a confirmation is made that an attention request by another user, i.e. a user interface is input while the robot performs a task. If the presence of the user interface is confirmed, the robot performs a task busy attention. Here, the task busy attention is an action to prepare for interaction with another user interface (S71 and S72).

After the robot completes the preparation of a dialog with another user via the task busy attention, the robot performs a task-busy-interrupt-dialog. Considering that the robot is performing a task instruction input by the previous user, the task-busy-interrupt-dialog may deal with a message "Sorry, I am performing other things", etc. (S73).

If the absence of the optional user interface is confirmed in the operation (S71), to enable task interaction between the user and the robot in the busy state, the robot performs a task attention (S80).

As a dialog mode is prepared via the task attention of the robot, the robot performs a task-specific-dialog required for implementation of a user instruction task and completes an action via implementation of the user instruction task (S90).

If any interrupt is input during implementation of a dialog or task by the robot, the leader agent 16 confirms the state of the interaction agent 13 and transmits information about the confirmed state to the dialog manager 3. Thereby, the robot can determine whether or not the robot performs a call-and-come dialog, a user-interface-busy-interrupt-dialog, a task-busy-interrupt-dialog, or a task-specific-dialog.

As is apparent from the above description, a judgment system for an intelligent robot according to exemplary embodiments includes a multi-agent system consisting of three agents, assisting separation of concerns and accordingly, enhancing convenience of development.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. An intelligent humanoid service robot having a judgment system, wherein the judgment system comprises:
   a dialog system, using a database, including a dialog manager to manage the progress of a dialog of the intelligent robot with a user; and
   a task-planning system which includes a leader agent, an action agent and an interaction agent and which controls a goal, plan and action of a task to be performed by the intelligent robot based on the dialog,
   wherein the leader agent integrates and regulates other agents while maintaining a high-level-goal, and
   wherein the interaction agent analyzes the goal which is transmitted from the dialog system and the interaction agent allows the leader agent to initiate an action corresponding to the high-level goal.

2. The robot according to claim 1, wherein the action agent controls sensing and actuation related to hardware.

3. The robot according to claim 1, wherein the interaction agent monitors a state of the dialog manager and reflects the state of the dialog manager in the task goal, plan and action of the task-planning system.

4. The robot according to claim 1, wherein the judgment system further comprises a situation recognizer,
   wherein the situation recognizer synthesizes a dialog situation, a task implementation situation, or sensor input situation, so as to transmit desired information to the dialog system or task-planning system.

5. The robot according to claim 1, wherein the judgment system further comprises a database,
   wherein the database stores information generated by the intelligent robot.

6. The robot according to claim 1, wherein the dialog system and the task-planning system are coupled to each other via a homogeneous or heterogeneous communication protocol.

7. The robot according to claim 1, wherein the dialog manager generates a response via comprehension of a meaning of a dialog input by a speaker and synthetic situation judgment.

8. A control method of an intelligent robot comprising a dialog system including a dialog manager to manage the progress of a dialog of the intelligent robot, and a task-planning system which includes a leader agent, an action agent and an interaction agent, and which controls a goal, plan and action of a task to be performed by the intelligent robot based on the dialog, the control method comprising:
   transiting the interaction agent to an idle state;
   sensing a user interface via the dialog manager;
   allowing the robot to perform a user interface attention if the user interface is sensed; and
   performing a call-and-come dialog with a user by the dialog manager if the user interface attention is performed,
   wherein the leader agent integrates and regulates other agents while maintaining a high-level-goal, and
   wherein the interaction agent analyzes the goal which is transmitted from the dialog system and the interaction agent allows the leader agent to initiate an action corresponding to the high-level goal.

9. The control method according to claim 8, further comprising:
   transiting the interaction agent to a busy state if the call-and-come dialog is performed.

10. The control method according to claim 9, further comprising:
    sensing whether or not an additional user interface is generated before the interaction agent is transited to the busy state.

11. The control method according to claim 10, further comprising:
    performing a user-interface-busy-interrupt-dialog if the additional user interface is generated.

12. The control method according to claim 9, further comprising:
sensing whether or not an additional user interface is generated if the interaction agent is transited to the busy state.

13. The control method according to claim 12, further comprising:
performing a task busy attention if the presence of the additional user interface is confirmed.

14. The control method according to claim 13, further comprising:
performing a task-busy-interrupt-dialog if the task busy attention is performed.

15. The control method according to claim 9, further comprising:
performing a task attention if the interaction agent is transited to the busy state.

16. The control method according to claim 15, further comprising:
performing a task-specific-dialog if the task attention is performed.

* * * * *

UNITED STATES PATENT AND TRADEMARK OFFICE
CERTIFICATE OF CORRECTION

PATENT NO. : 8,392,341 B2
APPLICATION NO. : 12/591609
DATED : March 5, 2013
INVENTOR(S) : Kang Hee Lee It is certified that error appears in the above-identified patent and that said Letters Patent is hereby corrected as shown below:

Title Page, Item (56) (Other Publications), Line 1, Delete "'Ubiguitous" and insert -- 'Ubiquitous --, therefor.

Signed and Sealed this
Sixth Day of August, 2013

Teresa Stanek Rea
*Acting Director of the United States Patent and Trademark Office*